United States Patent [19]

Shimura

[11] Patent Number: 5,754,625
[45] Date of Patent: May 19, 1998

[54] RADIO PHONE APPARATUS HAVING COMPACT CORDLESS EXTENSION UNIT

[75] Inventor: Yukihiro Shimura, Tokyo, Japan

[73] Assignee: NEC Corporation, Japan

[21] Appl. No.: 283,078

[22] Filed: Jul. 29, 1994

[30] Foreign Application Priority Data

Jul. 31, 1993 [JP] Japan ................... 5-208604

[51] Int. Cl.⁶ .................................................. H04M 11/00
[52] U.S. Cl. ........................................... 379/61; 379/58
[58] Field of Search ........................ 379/61, 58, 430; 455/89, 90

[56] References Cited

U.S. PATENT DOCUMENTS

| | | | |
|---|---|---|---|
| 4,659,878 | 4/1987 | Dinkins | 379/61 |
| 4,910,761 | 3/1990 | Shimura | 379/61 |
| 4,939,770 | 7/1990 | Makino | 379/58 |
| 5,081,668 | 1/1992 | Ito | 379/58 |
| 5,109,537 | 4/1992 | Toki | 379/62 |
| 5,123,042 | 6/1992 | Saegusa | 379/61 |
| 5,148,470 | 9/1992 | Kobayashi | 379/61 |
| 5,157,710 | 10/1992 | Itoh | 379/62 |
| 5,203,020 | 4/1993 | Sato et al. | 379/58 |
| 5,327,482 | 7/1994 | Yamamoto | 379/61 |
| 5,351,283 | 9/1994 | Kunitomo | 379/58 |

FOREIGN PATENT DOCUMENTS

| | | | |
|---|---|---|---|
| 0303067 | 2/1989 | European Pat. Off. | 379/61 |
| A-63-94748 | 4/1988 | Japan | H04M 1/00 |
| 0287239 | 11/1988 | Japan | 379/58 |
| 0152351 | 6/1990 | Japan | 379/61 |
| 40421535/A | 8/1992 | Japan | 379/61 |
| 405152990A | 6/1993 | Japan | 379/58 |
| 406164468A | 6/1994 | Japan | 379/61 |
| 2230922 | 10/1990 | United Kingdom | H04Q 7/04 |
| 2258121A | 1/1993 | United Kingdom | 379/58 |

Primary Examiner—Joseph Mancuso
Assistant Examiner—Jerome Grant, II
Attorney, Agent, or Firm—Ostrolenk, Faber, Gerb & Soffen, LLP

[57] ABSTRACT

In a radio telephone apparatus including a host phone unit, a cordless extension unit connected by radio waves to the host phone unit, and a charger unit for charging the cordless extension unit, a phone number inputting keyboard is provided in the charger unit.

20 Claims, 6 Drawing Sheets

RADIO PHONE APPARATUS HAVING COMPACT CORDLESS EXTENSION UNIT

BACKGROUND OF THE INVENTION

1. Field of the Invention

The present invention relates to a radio phone apparatus having a host phone unit, a cordless extension unit and a charger unit for charging the cordless extension unit.

2. Description of the Related Art

In a radio phone apparatus including a host phone unit, a cordless extension unit connected by radio waves to the host phone unit and having a battery, and a charger unit for charging the battery incorporated into the cordless extension unit, when the cordless extension unit is located on the charger unit, the battery is charged by the charger unit. Then, when the cordless extension unit is lifted up from the charger unit and a dialing operation is carried out by using a keyboard located in the cordless extension unit, the cordless extension unit is driven by the battery so as to establish a communication with the host phone unit which is further connected to a telephone network. The mounting of the keyboard on the cordless extension unit, however, increases the cordless extension unit in size and weight.

Also, in order to generate phone numbers by using abbreviated phone numbers, a correspondence between the abbreviated phone numbers and the phone numbers has to be stored in a memory in advance. In the prior art, however, such a memory is also mounted in the cordless extension unit, thus increasing the cordless extension unit in size and weight.

Note that it may be suggested to incorporate the above-mentioned memory into the host phone unit; however, in this case, it is complex to register abbreviated phone numbers. Also, when displaying phone numbers in the cordless extension unit, the displaying speed is reduced by the limitation of data transfer between the host phone unit and the cordless extension unit.

Further, a display unit for displaying a phone number or the like being provided in the cordless extension unit, thereby further increases the cordless extension unit in size and weight.

SUMMARY OF THE INVENTION

It is an object of the present invention to provide a compact cordless extension unit for a radio phone apparatus.

According to the present invention, in a radio telephone apparatus including a host phone unit, a cordless extension unit connected by radio waves to the host phone unit, and a charger unit for charging the cordless extension unit, a keyboard for inputting a number to dial is provided in the charger unit. Also, a memory for storing a correspondence between abbreviated phone numbers and actual phone numbers is incorporated into the charger unit. Further, a display unit is provided in the charger unit. Thus, the cordless extension unit is reduced in size and weight.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENT

Figure 1:
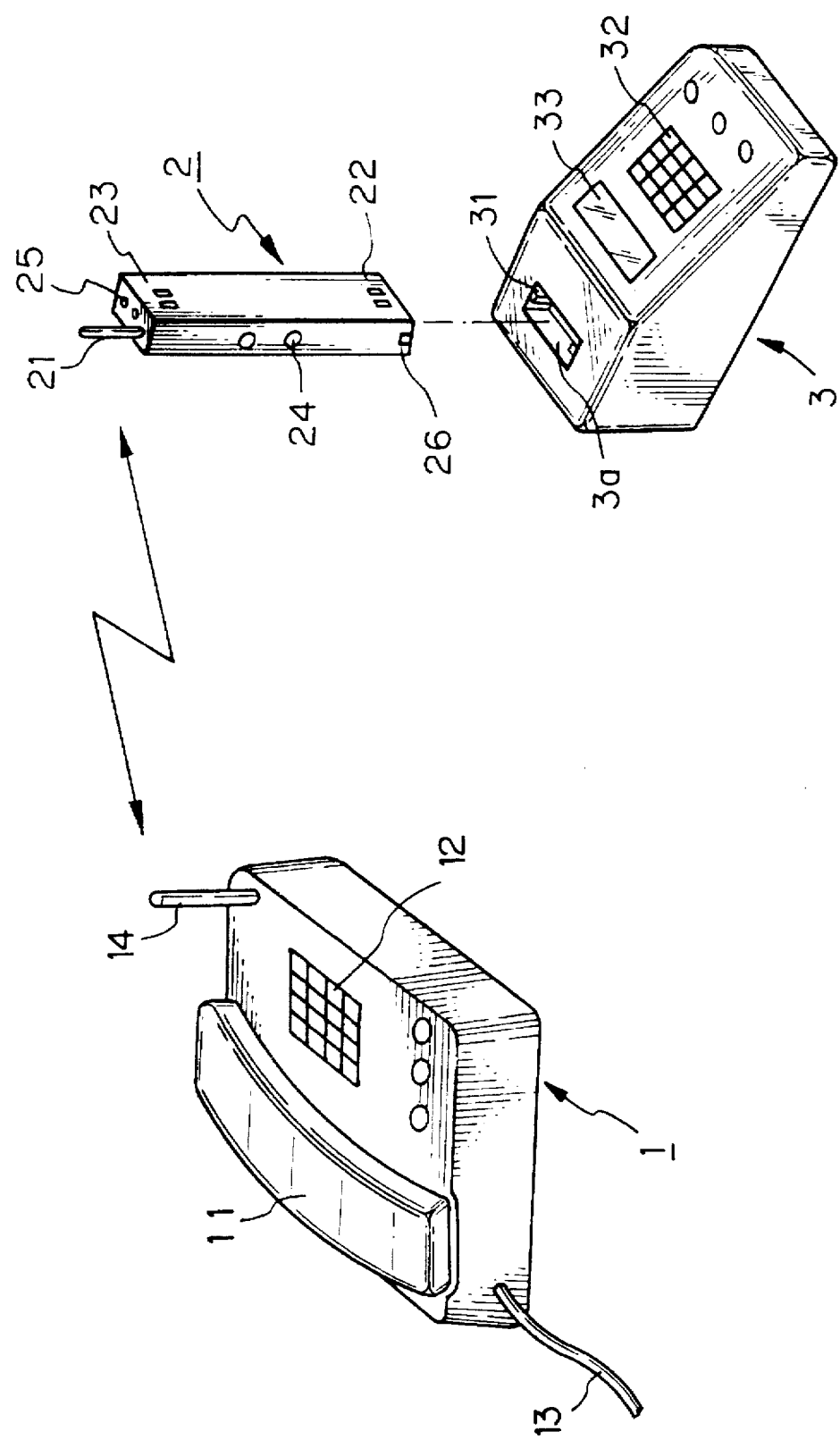
FIG. 1 is a perspective view illustrating an embodiment of the radio phone apparatus according to the present invention.

In FIG. 1, which illustrates an embodiment of the present invention, reference numeral 1 designates a host phone unit, 2 designates a cordless extension unit, and 3 designates a charger unit.

The host phone unit 1 has a handset 11 and a keyboard 12, and therefore, the host phone unit 1 serves as an independent phone set. The host phone unit 1 is connected via a telephone line 13 to a telephone line network (not shown).

Also, the host phone unit 1 has an antenna element 14, and the cordless extension unit 2 has an antenna element 21, and thus the host phone unit 1 and the cordless extension unit 2 are connected by radio waves to each other.

The cordless extension unit 2 has a microphone 22, an ear piece 23, various function keys 24 such as a hook key and a hold key and light emitting diodes (LED's) 25 for displaying the states of various functions. Also, provided at the bottom of the cordless extension unit 2 is a terminal unit 26 for connection with the charger unit 3.

Figure 2:
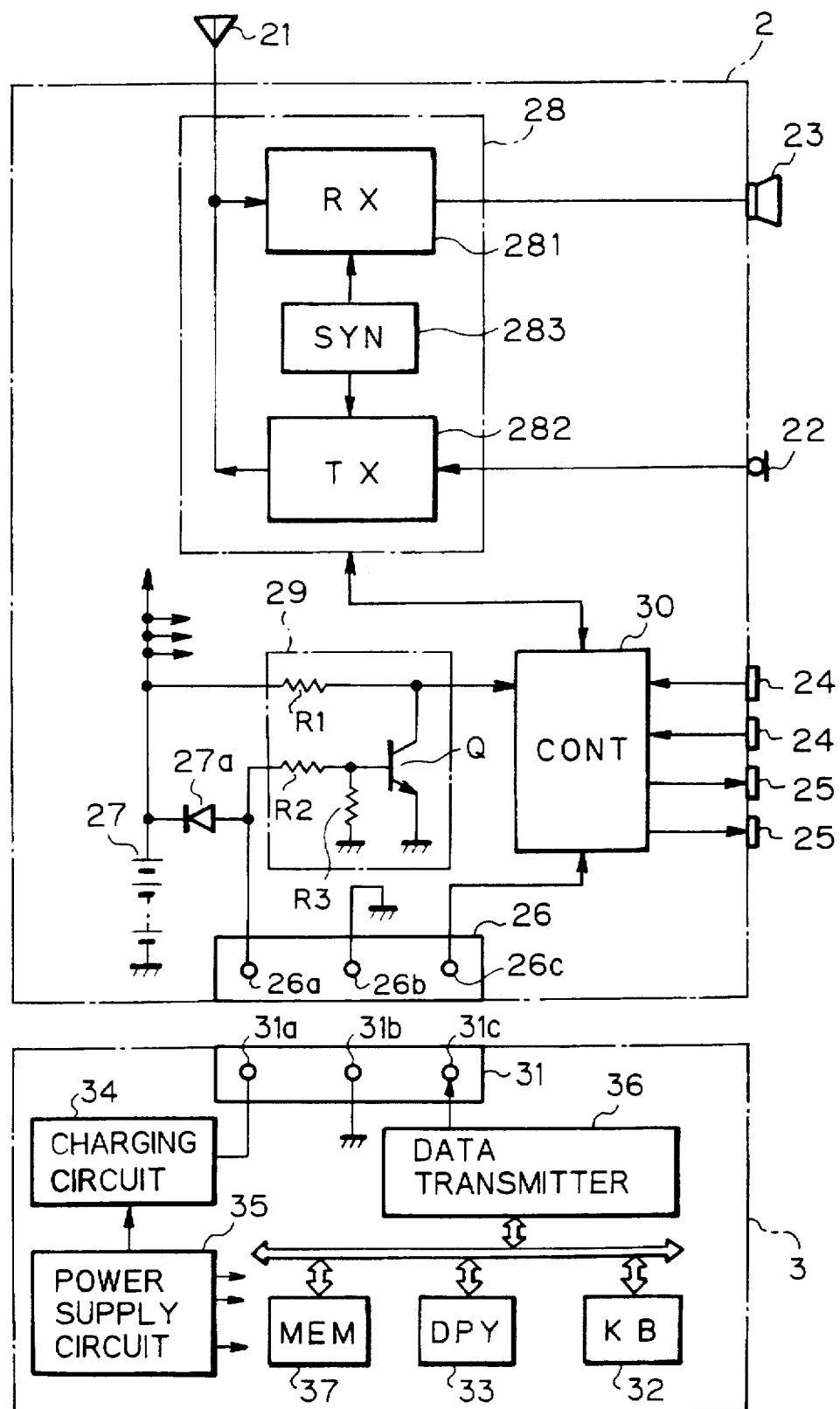
FIG. 2 is a circuit diagram of the cordless extension unit and the charger unit of FIG. 1.

When the cordless extension unit 2 is taken out of the charger unit 3, the cordless extension unit 2 is driven by a battery 27 (shown not in FIG. 1, but in FIG. 2). On the other hand, when the cordless extension unit 2 is placed in the charger unit 3, the battery 27 of the cordless extension unit 2 is charged by the charger unit 3.

The charger unit 3 is constructed as a stationary type connected to a commercial power supply source (not shown). Also, formed on the top of the charger unit 3 is a recess 3a for accommodating the cordless extension unit 2. Further, a terminal unit 31 for contact with the terminal unit 26 of the cordless extension unit 2 is provided at the bottom of the recess 3a. Also, a keyboard 32 as a dial means and a display unit 33 for displaying a phone number and switching states of various functions are provided on the charger unit 3.

FIG. 2 is a detailed circuit diagram of the cordless extension unit 2 and the charger unit 3.

In the charging unit 3, the terminal unit 31 is comprised of terminals 31a, 31b and 31c. The terminal 31a is connected to a charging circuit 34 which is also connected to a power supply circuit 35 which supplies power voltages to various portions of the charger circuit 3. The terminal 31b is grounded. The terminal 31c is connected to a data transmitter 36 which is also connected to a large capacity memory 37 for storing a correspondence between abbreviated phone numbers and actual phone numbers, in addition to the keyboard 32 and the display unit 33.

On the other hand, the cordless extension unit 2 includes a transceiver 28 which is formed by a receiver 281 interposed between the antenna element 21 and the ear piece 23, a transmitter 282 interposed between the microphone 22 and the antenna element 21, and a synthesizer 283 connected to the receiver 281 and the transmitter 282.

The terminal unit 26 is comprised of terminals 26a, 26b and 26c. The terminal 26a is connected via a diode 27a to the battery 27, and is also connected to a charging operation detecting circuit 29. The terminal 26b is grounded. The terminal 26c is connected to a control circuit 30 which is also connected to the transceiver 28 and the charging operation detecting circuit 29, in addition to the function keys 24 and the LED's 25.

The terminals 26a, 26b and 26c of the terminal unit 26 correspond to the terminals 31a, 31b and 31c of the terminal unit 31, respectively. Therefore, when the cordless extension unit 2 is placed into the charger unit 3, the terminals 26a, 26b and 26c are in contact with the terminals 31a, 31b and 31c, respectively.

The charging operation detecting circuit 29 is formed by a transistor Q and three resistors R1, R2 and R3. Therefore, when the cordless extension unit 2 is placed into the charger unit 3, i.e., when the battery 27 is being charged, the transistor Q is turned ON, so that the output of the charging operation detecting circuit 29 is low (="0"). On the contrary, when the cordless extension unit 2 is taken out of the charger unit 3, i.e., when the battery 27 is not being charged, the transistor Q is turned OFF, so that the output of the charging operation detecting circuit 29 is high (="1"). That is, the charging operation detecting circuit 29 determines whether the cordless extension unit 2 is taken out of or placed into the charger unit 3.

Figure 3:
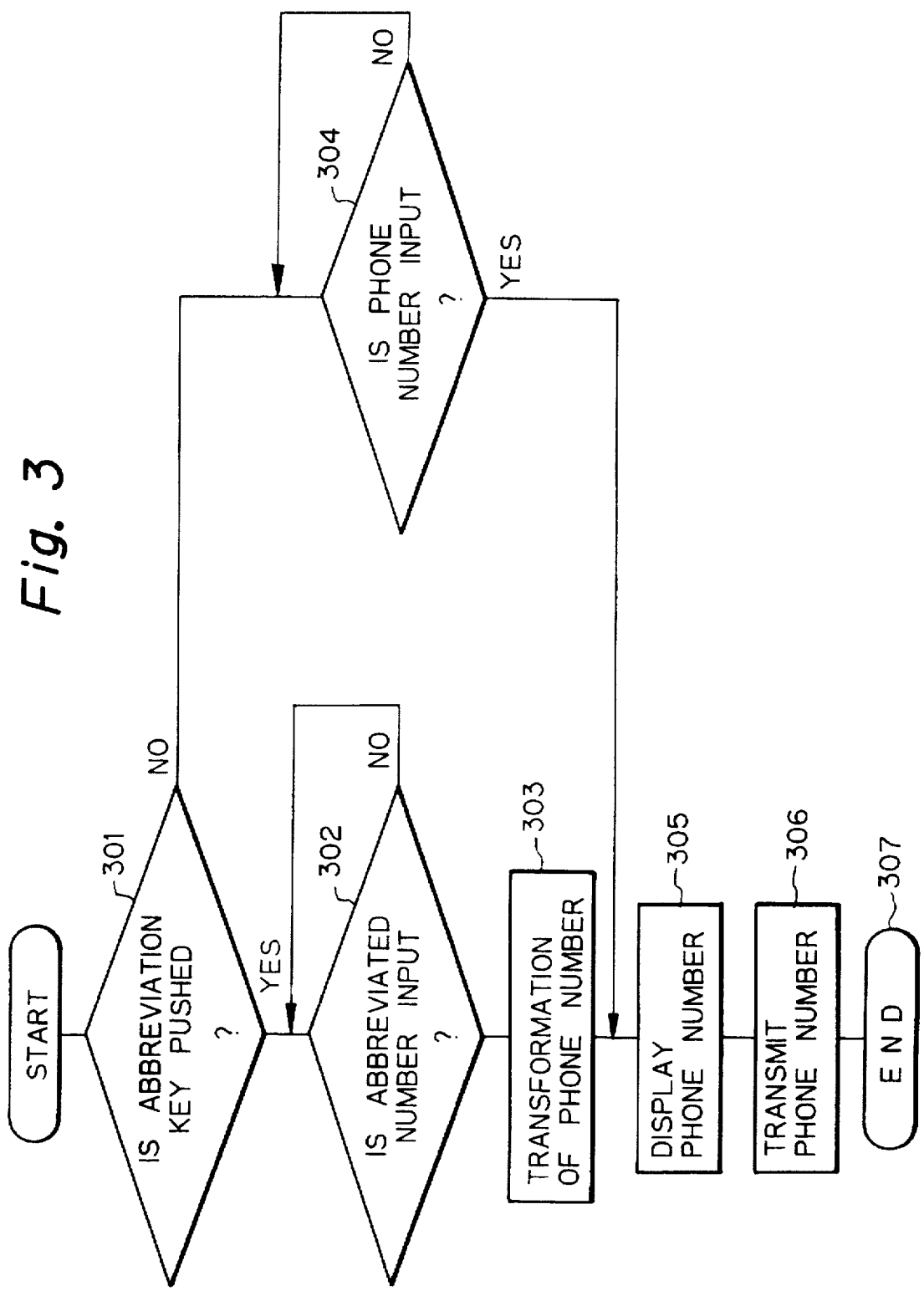
FIG. 3 is a flowchart showing the operation of the data transmitter of FIG. 2.

The operation of the data transmitter 36, which is constructed by a microprocessor, will be explained next with reference to FIG. 3. The routine of FIG. 3 is started by pushing a start key (not shown) or the like.

At step 301, it is determined whether or not the abbreviation key of the keyboard 32 is pushed. At step 301, when it is determined that the abbreviation key is pushed, the control proceeds to step 302 which waits for an abbreviated phone number to be input. Only when an abbreviated phone number is input, does the control proceed to step 303 which transforms the abbreviated phone number to an actual phone number with reference to the correspondence table stored in the memory 37. Then, the control proceeds to step 305. On the other hand, at step 301, when it is determined that the abbreviated key is not pushed, the control proceeds to step 304 which waits for a phone number to be input. Only when a phone number is input, does the control proceed to step 305.

At step 305, the phone number transformed at step 303 or input at step 304 is displayed on the display unit 33.

Then, at step 306, the phone number is transmitted from the terminal 31c via the terminal 26c to the control circuit 30 when the terminal 31c is connected to the terminal 26c.

Thus, the routine of FIG. 3 is completed by step 307.

Figure 4:
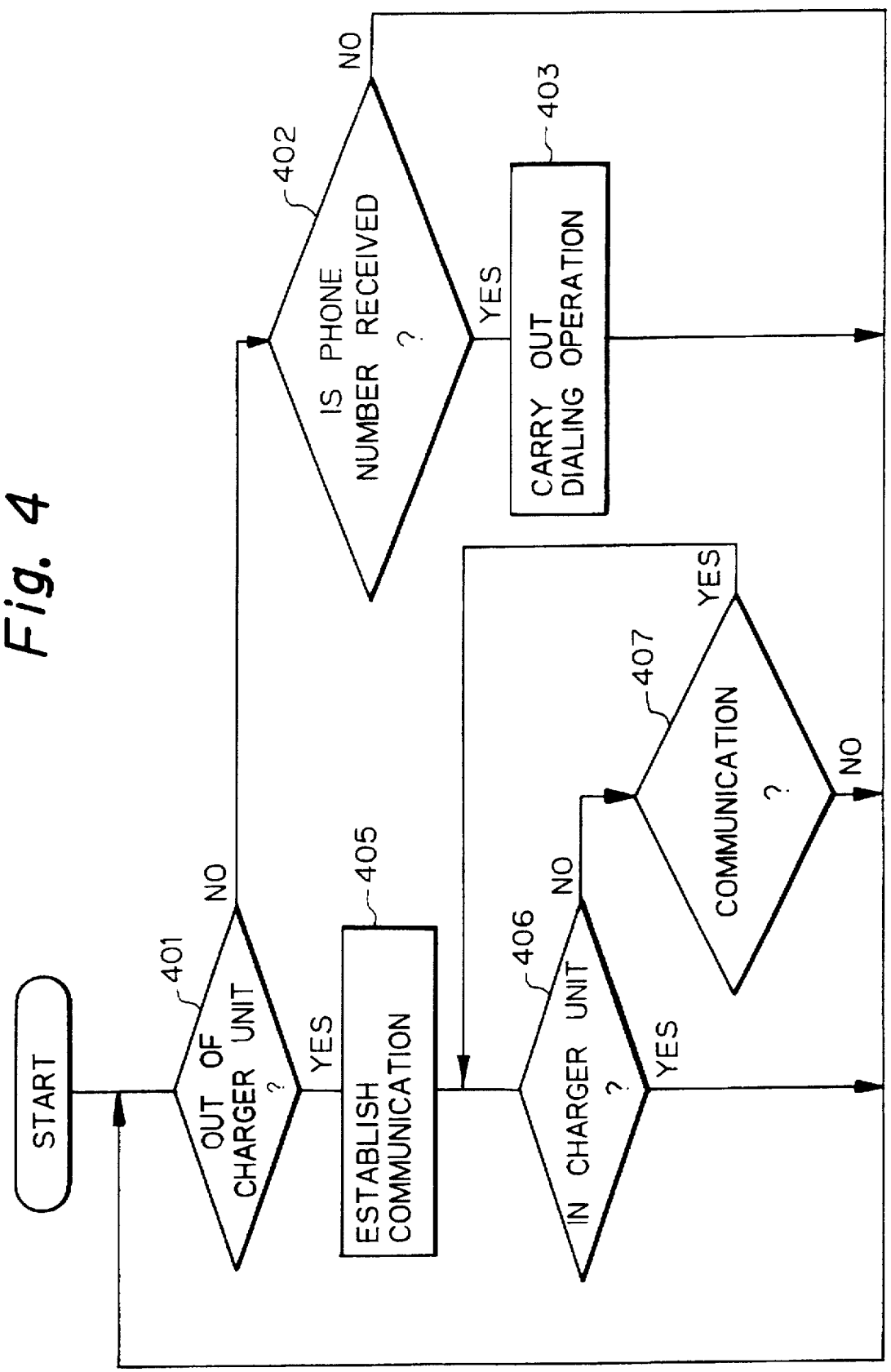
FIG. 4 is a flowchart showing the operation of the control circuit of FIG. 2.

The operation of the control circuit 30, which is also constructed by a microprocessor, will be explained next with reference to FIG. 4. The routine of FIG. 4 is started when the potential of the battery 27 is higher than a predetermined value.

At step 401, it is determined whether or not the cordless extension unit 2 is taken out of the charger unit 3 by using the output of the charging operation detecting circuit 29.

At step 401, when it is determined that the cordless extension unit 2 is placed into the charger unit 3, the control proceeds to step 402. At step 402, it is determined whether or not a phone number is received from the data transmitter 36 of the charger unit 3. Only when the phone number is received, does the control proceed to step 403 which carries out a dialing operation with the host phone unit 1. Otherwise, the control returns directly to step 401.

At step 401, when it is determined that the cordless extension unit 2 is taken out of the charger unit 3, the control proceeds to step 405 which establishes communication via the host phone unit 1 with the telephone network in accordance with the dialing operation carried out at step 403. Note that, during a reception mode, communication is automatically established by picking up the cordless extension unit 2.

Then, at step 406, the placing of the cordless extension unit 2 in to the charger unit 3 is awaited. Only when the cordless extension unit 2 is placed into the charger unit 3, does the control return to step 401. In this case, even when the cordless extension unit 2 is not placed in to the charger unit 3, if the calling party interrupt the communication, the control returns via step 407 to step 401.

Figure 5:
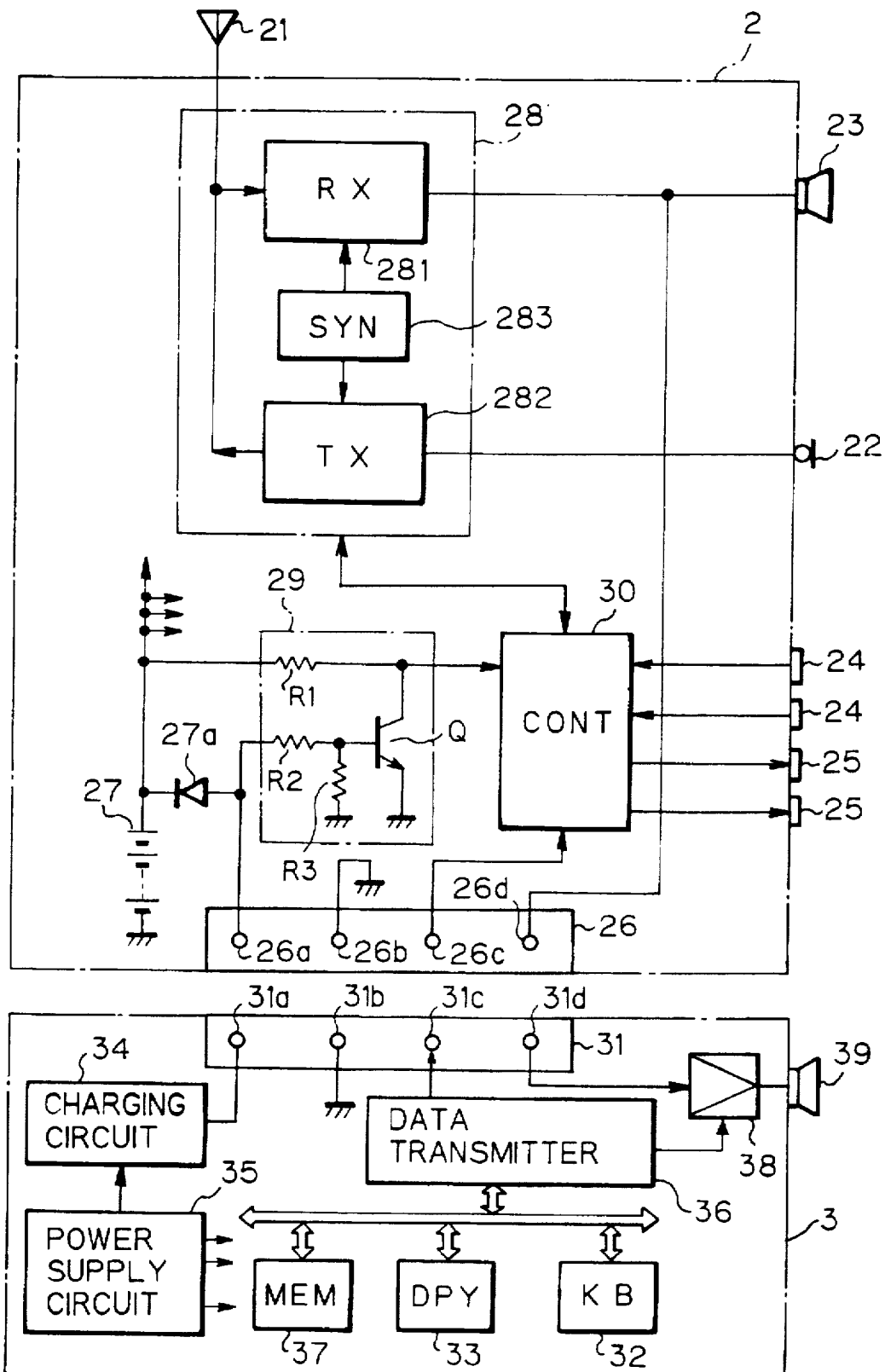
FIG. 5 is a circuit diagram illustrating a modification of the circuit of FIG. 2.
Figure 6:
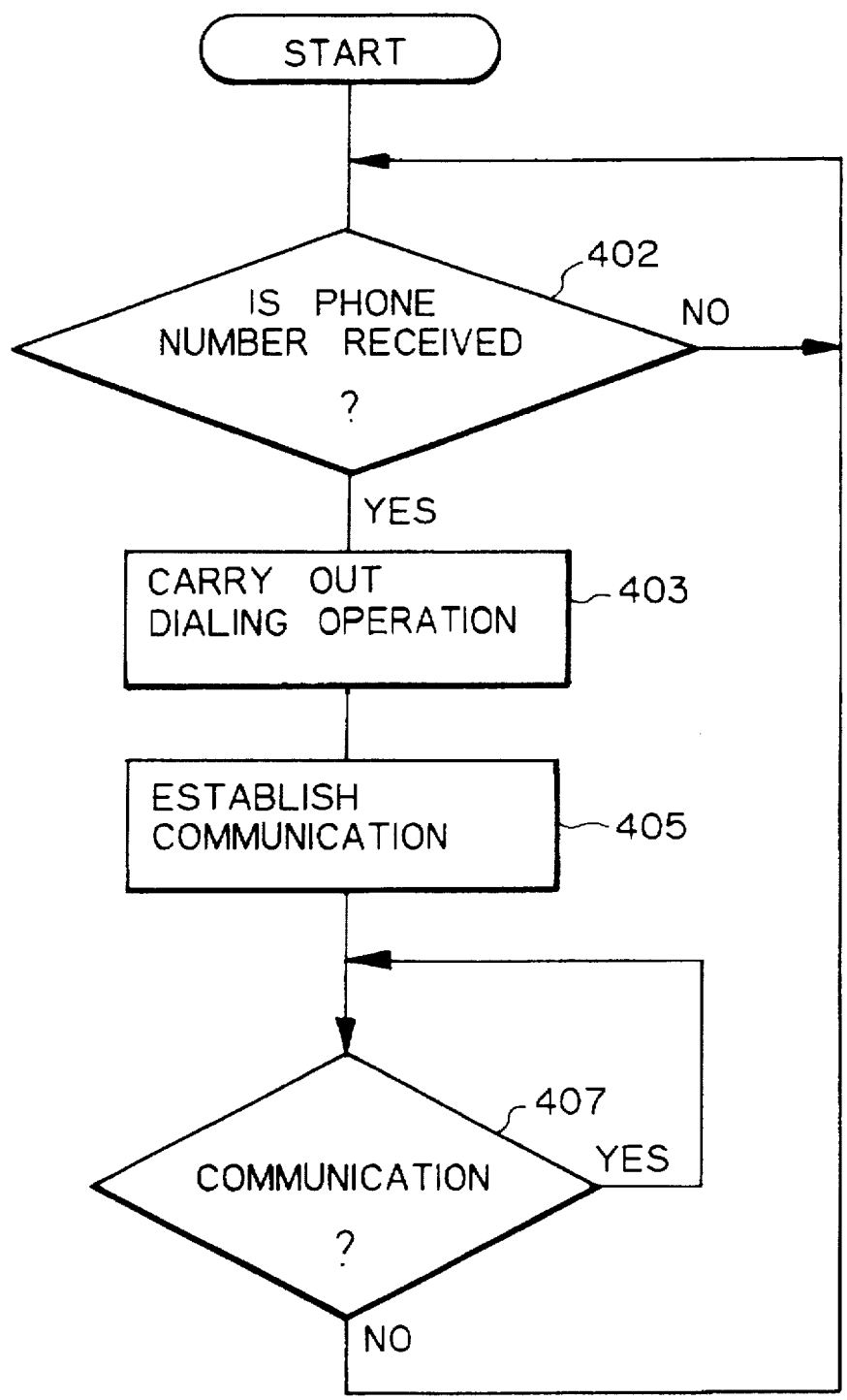
FIG. 6 is a flowchart that is a modification of the flowchart of FIG. 4.

In FIG. 5, which is a modification of FIG. 2, the charger unit 3 further includes a power amplifier 38 and a loudspeaker 39. The power amplifier 38 is connected to the receiver 281 of the cordless extension unit 2. For this purpose, a terminal 26d is added to the terminal unit 26 and a terminal 31d is added to the terminal 31. Note that the power amplifier 38 is turned ON and OFF by the data transmitter 36. Thus, a loud speech is established. In this case, the operation of the control circuit 30 is shown in FIG. 6 where steps 401 and 406 are deleted from FIG. 4.

As explained hereinbefore, according to the present invention, since a keyboard for inputting a number to dial and the like is provided in a charger unit for charging a battery incorporated into a cordless extension unit the cordless extension unit can be reduced in size and weight.

I claim:

1. A radio telephone apparatus comprising:

a host phone unit;

a cordless extension unit connected by radio waves to said host phone unit; and a charger unit for charging said cordless extension unit, said charger unit comprising:
first and second terminals;
a charging circuit connected to said first terminal;
a phone number inputting means; and
a data transmitter, connected to said phone number inputting means and said second terminal, for transmitting a phone number input from said phone number inputting means to said second terminal, said cordless extension comprising:
third and fourth terminals;
a battery connected to said third terminal;
a charging operation detecting circuit, connected to said third terminal, for detecting that said battery is being charged by said charging circuit;
a transceiver for carrying out a communication with said host phone unit; and
a control circuit, connected to said transceiver, said charging operation detecting circuit, and said fourth terminal, said first and second terminals being electrically connected to said third and second terminals, respectively, when said cordless extension is accommodated in said charger unit.

2. An apparatus as set forth in claim 1, wherein said charger unit further includes:

a storing means, connected to said data transmitter, for storing a correspondence table containing a correspondence between abbreviated phone numbers and actual phone numbers;

said data transmitter comprising:

means for determining whether or not an abbreviation key of said phone number inputting means is pushed;

means for transforming an abbreviated dial number input from said phone number inputting means into an actual phone number with reference to the correspondence table stored in said storing means, when the abbreviation key of said phone number inputting means is pushed;

means for transmitting the phone number transformed by said transforming means to said second terminal, when the abbreviation key of said phone number inputting means is pushed; and means for transmitting a phone number input from said phone number inputting means to said second terminal, when the abbreviation key of said phone number inputting means is not pushed.

3. An apparatus as set forth in claim 2, wherein said charger unit further includes a display unit, connected to said data transmitter, for displaying the phone number transformed by said transforming means and input from said phone number inputting means.

4. An apparatus as set forth in claim 1, wherein said control circuit comprises:

means for determining whether or not said battery is being charged by said charging circuit;

means for operating said transceiver to carry out a dialing operation with said host phone unit in accordance with phone information input from said phone number inputting means, when said battery is being charged by said charging circuit;

means for operating said transceiver to establish a communication in accordance with the dialing operation when said battery is not charged by said charging circuit; and means for operating said transceiver to interrupt the communication when said battery is being charged by said charging circuit.

5. An apparatus as set forth in claim 1, wherein said charging operation circuit comprises a transistor powered by said battery, said transistor being controlled by a potential at said third terminal.

6. An apparatus as set forth in claim 1, wherein said phone number inputting means comprises a keyboard.

7. An apparatus as set forth in claim 1, wherein said charger unit further includes:

a fifth terminal; and a loudspeaker connected to said fifth terminal, said loudspeaker being controlled by said data transmitter, said cordless extension unit including a sixth terminal connected to said transceiver, said fifth terminal being electrically connected to said sixth terminal, when said cordless extension is accommodated in said charger unit.

8. A radio telephone apparatus comprising:

a host phone unit;

a cordless extension unit connected by radio waves to said host phone unit; and a charger unit for charging said cordless extension unit, said charger unit comprising:

a first and second terminals;

a charging circuit connected to said first terminal;

a keyboard; and a data transmitter, connected to said keyboard and said second terminal, for transmitting a phone number input from said keyboard to said second terminal, said cordless extension comprising:

third and fourth terminals;

battery connected to said third terminal;

a charging operation detecting circuit, connected to said third terminal, for detecting that said battery is being charged by said charging circuit;

a transceiver for carrying out a communication with said host phone unit; and a control circuit, connected to said transceiver, said charging operation detecting circuit, and said fourth terminal, said first and second terminals being electrically connected to said third and second terminals, respectively, when said cordless extension is accommodated in said charger unit.

9. An apparatus as set forth in claim 8, wherein said charger unit further includes:

a memory, connected to said data transmitter, for storing a correspondence table containing a correspondence between abbreviated phone numbers and actual phone numbers;

said data transmitter comprising:

determining unit to determine whether or not an abbreviation key of said keyboard is pushed;

transforming unit to transform an abbreviated dial number input from said keyboard into an actual phone number with reference to the correspondence table stored in said memory, when the abbreviation key of said keyboard is pushed;

first transmitting unit to transmit the phone number transformed by said transforming unit to said second terminal, when the abbreviation key of said keyboard is pushed; and second transmitting unit to transmit a phone number input from said keyboard to said second terminal, when the abbreviation key of said keyboard is not pushed.

10. An apparatus as set forth in claim 9, wherein said charger unit further includes a display unit, connected to said data transmitter, for displaying the phone number transformed by said transforming unit and inputted from said keyboard.

11. An apparatus as set forth in claim 8, wherein said control circuit comprises:

determining unit to determine whether or not said battery is being charged by said charging circuit;

first operating unit to operate said transceiver to carry out a dialing operation with said host phone unit in accordance with phone information input from said keyboard, when said battery is being charged by said charging circuit;

second operating unit to operate said transceiver to establish a communication in accordance with the dialing operation when said battery is not charged by said charging circuit; and third operating unit to operate said transceiver to interrupt the communication when said battery is being charged by said charging circuit.

12. An apparatus as set forth in claim 8, wherein said charging operation circuit comprises a transistor powered by said battery, and said transistor being controlled by a potential at said third terminal.

13. An apparatus as set forth in claim 8, wherein said charger unit further includes:

a fifth terminal; and a loudspeaker connected to said fifth terminal, said loudspeaker being controlled by said data transmitter, said cordless extension unit including a sixth terminal connected to said transceiver, said fifth terminal being electrically connected to said sixth terminal, when said cordless extension is accommodated in said charger unit.

14. A radio telephone apparatus comprising:

a host phone unit;

a cordless extension unit connected by radio waves to said host phone unit; and a charger unit for charging said cordless extension unit, said charger unit comprising:
  first and second terminals;
  a charging circuit connected to said first terminal;
  a phone number inputting device; and
  a data transmitter connected to said phone number inputting device and said second terminal to transmit a phone number input from said phone number inputting device to said second terminal, said cordless extension comprising;
  third and fourth terminals;
  a battery connected to said third terminal;
  a charging operation detecting circuit connected to said third terminal to detect that said battery is being charged by said charging circuit;
  a transceiver for carrying out a communication with said host phone unit; and
  a control circuit connected to said transceiver, said charging operation detecting circuit, and said fourth terminal, said first and second terminals being electrically connected to said third and second terminals, respectively, when said cordless extension is accommodated in said charger unit.

15. An apparatus as set forth in claim 14, wherein said charger unit further includes:

a storing device connected to said data transmitter to store a correspondence table containing a correspondence between abbreviated phone numbers and actual phone numbers;

said data transmitter comprising:
  a determining device to determine whether or not an abbreviation key of said phone number inputting device is pushed;
  a transforming device to transform an abbreviated dial number input from said phone number inputting device into an actual phone number with reference to the correspondence table stored in said storing device, when the abbreviation key of said phone number inputting device is pushed;
  a transformed phone number transmitting device to transmit the phone number transformed by said transforming device to said second terminal, when the abbreviation key of said phone number inputting device is pushed; and
  an input phone number transmitting device to transmit a phone number input from said phone number inputting device to said second terminal, when the abbreviation key of said phone number inputting device is not pushed.

16. An apparatus as set forth in claim 15, wherein said charger unit further includes a display unit connected to said data transmitter to display the phone number transformed by said transforming device and input from said phone number inputting device.

17. An apparatus as set forth in claim 14, wherein said control circuit comprises:
  a determining device to determine whether or not said battery is being charged by said charging circuit;
  a transceiver operating device to operate said transceiver to carry out a dialing operation with said host phone unit in accordance with phone information input from said phone number inputting device, when said battery is being charged by said charging circuit;
  an establish operating device to operate said transceiver to establish a communication in accordance with the dialing operation when said battery is not charged by said charging circuit; and
  an interrupt operating device to operate said transceiver to interrupt the communication when said battery is being charged by said charging circuit.

18. An apparatus as set forth in claim 14, wherein said charging operation circuit comprises a transistor powered by said battery, said transistor being controlled by a potential at said third terminal.

19. An apparatus as set forth in claim 14, wherein said phone number inputting device comprises a keyboard.

20. An apparatus as set forth in claim 14, wherein said charger unit further includes:

a fifth terminal; and a loudspeaker connected to said fifth terminal, said loudspeaker being controlled by said data transmitter, said cordless extension unit including a sixth terminal connected to said transceiver, said fifth terminal being electrically connected to said sixth terminal, when said cordless extension is accommodated in said charger unit.

* * * * *